US008198878B2

(12) United States Patent
Bandholz et al.

(10) Patent No.: US 8,198,878 B2
(45) Date of Patent: Jun. 12, 2012

(54) WORKLOAD BALANCING AMONG POWER SWITCHING COMPONENTS IN A MULTIPHASE SWITCHING POWER SUPPLY

(75) Inventors: Justin P. Bandholz, Cary, NC (US); Pravin Patel, Cary, NC (US); Philip L. Weinstein, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/270,989

(22) Filed: Nov. 14, 2008

(65) Prior Publication Data

US 2010/0123440 A1    May 20, 2010

(51) Int. Cl.
    *G05F 1/00* (2006.01)
(52) U.S. Cl. .................... 323/282; 323/271; 323/284
(58) Field of Classification Search ............. 323/268, 323/271, 272, 282, 284; 363/65, 67, 69, 363/71
    See application file for complete search history.

(56) References Cited

U.S. PATENT DOCUMENTS

| 6,362,986 | B1  | 3/2002  | Schultz et al. |
| 6,674,274 | B2* | 1/2004  | Hobrecht et al. ............ 323/285 |
| 6,912,144 | B1* | 6/2005  | Clavette .......................... 363/98 |
| 7,026,798 | B2* | 4/2006  | Cheung et al. ................ 323/225 |
| 7,046,685 | B1* | 5/2006  | Matsuoka et al. ............. 370/409 |
| 7,265,522 | B2* | 9/2007  | Sutardja et al. ............... 323/222 |
| 7,317,305 | B1  | 1/2008  | Stratakos et al. |
| 7,365,355 | B2* | 4/2008  | Parkinson ......................... 257/3 |
| 7,456,618 | B2* | 11/2008 | Jain et al. ...................... 323/272 |
| 7,777,461 | B2* | 8/2010  | Martin et al. .................. 323/272 |
| 7,852,053 | B2* | 12/2010 | Martin et al. .................. 323/272 |
| 7,898,233 | B2* | 3/2011  | Sato et al. ..................... 323/283 |
| 7,923,974 | B2* | 4/2011  | Martin et al. .................. 323/212 |
| 2002/0125869 | A1* | 9/2002 | Groom et al. .................. 323/283 |
| 2003/0201761 | A1  | 10/2003 | Harris |
| 2004/0081182 | A1* | 4/2004  | Tang et al. .................... 370/412 |
| 2005/0040848 | A1* | 2/2005  | Fowler ............................ 326/38 |
| 2005/0088156 | A1  | 4/2005  | Cheung et al. |
| 2006/0239046 | A1  | 10/2006 | Zane et al. |
| 2007/0013350 | A1  | 1/2007  | Tang et al. |
| 2009/0058379 | A1* | 3/2009  | Sreenivas ...................... 323/241 |

* cited by examiner

*Primary Examiner* — Adolf Berhane
*Assistant Examiner* — Emily Pham
(74) *Attorney, Agent, or Firm* — Brandon C. Kennedy; Cynthia G. Seal; Biggers & Ohanian, LLP

(57) ABSTRACT

Methods and apparatus for workload balancing among power switching components in a multiphase switching power supply, the power supply including one set of power switching components for each switching phase, where workload balancing includes: dropping one or more switching phases when output current demand on the power supply drops below a predetermined threshold, leaving at least one active switching phase; and rotating the at least one active switching phase among all sets of power switching components.

10 Claims, 2 Drawing Sheets

WORKLOAD BALANCING AMONG POWER SWITCHING COMPONENTS IN A MULTIPHASE SWITCHING POWER SUPPLY

BACKGROUND OF THE INVENTION

1. Field of the Invention

The field of the invention is data processing, or, more specifically, methods and apparatus for workload balancing among power switching components in a multiphase switching power supply.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One area of technology that has experienced advances is the area of power supply technology—power supplies configured to provide power to components of personal computers, to servers, to computer peripherals, to server racks, and so on. Many power supplies are switching power supplies that have multiple phases to reduce heat generation and increase power delivery efficiency in power switching components of the power supply. In such power supplies each phase is typically associated with a particular set of power switching components. When the power supply is configured with a low load, operating with many phases may be inefficient due to switching losses present in the switching components of each phase. To reduce such inefficiencies some multiphase power supplies are configured to drop phases when operating under a low load. Current multiphase power supplies configured for dropping phases, however, typically drop or 'turn off' the same sets of power switching components in the same order when deactivating phases. That is, in normal operation of current power supplies, when a first phase is dropped, a specified set of components is deactivated, when a second phase is dropped, another specified set of components is deactivated, and so on. Moreover, the same order of deactivating sets of switching components is followed each time phases are dropped in the power supply. Some sets of power switching components of current multiphase power supplies are therefore active more often than other sets. As such, the power switching components of such active phases experience greater use, greater wear, and age at a different rate than those power switching components of phases that are not active as often.

SUMMARY OF THE INVENTION

Methods and apparatus for workload balancing among power switching components in a multiphase switching power supply, the power supply including one set of power switching components for each switching phase, where workload balancing includes: dropping one or more switching phases when output current demand on the power supply drops below a predetermined threshold, leaving at least one active switching phase; and rotating the at least one active switching phase among all sets of power switching components.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
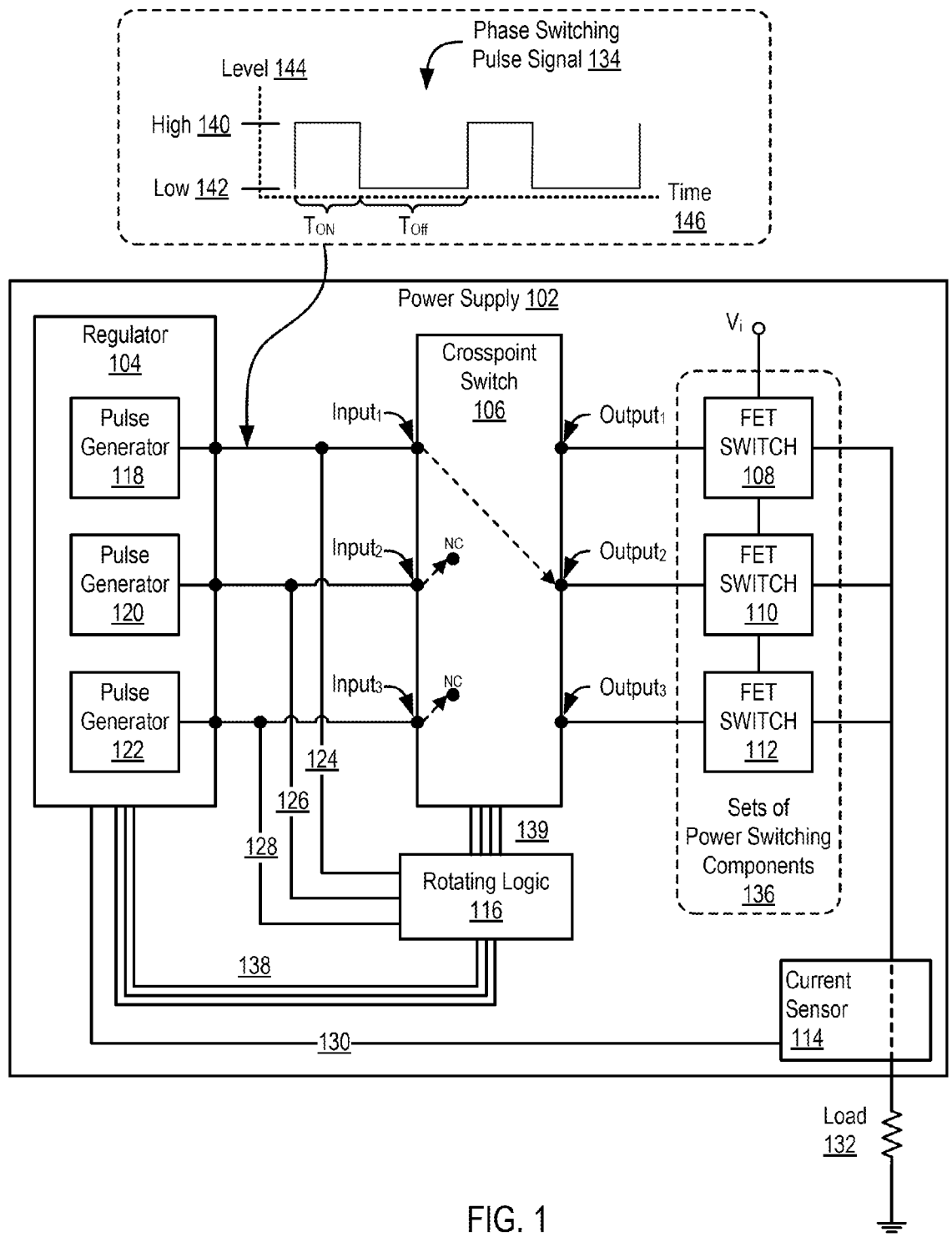
FIG. 1 sets forth a block diagram of a multiphase switching power supply configured for workload balancing among power switching components according to embodiments of the present invention.

Exemplary methods and apparatus for workload balancing among power switching components in a multiphase switching power supply in accordance with the present invention are described with reference to the accompanying drawings, beginning with FIG. 1. FIG. 1 sets forth a block diagram of a multiphase switching power supply configured for workload balancing among power switching components according to embodiments of the present invention. A phase, also referred to here as a switching phase, is collection of electrical components of a power supply configured to alternate operation of a set of power switching components, switching the components on and off at a particular frequency specified by a duty cycle. Power supplies (102) may be configured with multiple phases to distribute heat dissipation of power switching components, reduce jitter in power supply output current, and for other reasons that may occur to readers of skill in the art. A duty cycle is a specification, expressed as a fraction, of the time that an electrical signal is high. Switching a set (136) of power switching components on and off at a particular frequency specified by a duty cycle enables transmission of power from a power source ($V_i$), through the set (136) of power switching components to an electrical load (132) presently on the power supply (102). Each active phase of the power supply (102) provides a portion of the total current supplied to the electrical load (132) presently on the power supply. The power supply (102) of FIG. 1, includes three phases that, when active, include a pulse generator (118, 120, 122) delivering a phase switching pulse signal (134) through a crosspoint switch (106) to a Field-Effect Transistor ('FET') switch (108, 110, 112), an example set of power switching components. The power switching pulse signal (134) includes two signal levels, high (140) also referred to as 'on' and low, also referred to as 'off.' When operation of the FET switch (108, 110, 112) is alternated according to the phase switching pulse signal, the FET switch (108, 110, 112) enables transmission of power from a power source ($V_i$), through the FET switch (108, 110, 112) to an electrical load (132) presently on the power supply (102). The phase switching pulse signal (134) operates at a duty cycle specified as a ratio of: the time ($T_{ON}$) the pulse signal is on, a high voltage level (140), to the time ($T_{OFF}$) the pulse signal is off, a low voltage level (142).

The power supply (102) of FIG. 1 includes a regulator (104), a crosspoint switch (106), rotating logic (116), a current sensor (114), and several sets (136) of power switching components. The regulator (104) in the example of FIG. 1 is a collection of electrical components such as digital logic, oscillators, comparators, amplifiers, resistors, capacitors, and the like, configured to drop one or more switching phases when output current demand on the power supply drops below a predetermined threshold, leaving at least one active switching phase. Phase dropping is a power management technique in which a power supply is dynamically reconfigured, that is, reconfigured during operation of the power supply, to provide current to an electrical load by less than all of the switching phases of the power supplies. Phases may be dropped in a power supply for many different reasons. One example reason for which phases may be dropped during operation of the power supply (102) is that dropping phases reduces switching losses generated by sets (136) of power switching components. Heat generation and power consumption inefficiency of the remaining active phases and the individual sets of switching components of those active phases may increase upon dropping phases, but the increase is a relatively small due to the lesser current draw by the load on the power supply. As such, the increase in efficiency gained by reducing switching losses upon dropping phases in the power supply (102) is typically greater than the inefficiency generated in individual sets of power switching components of remaining, non-dropped active phases.

The regulator (104) in the example of FIG. 1 may drop phases by receiving a current sensing voltage on signal line (130) from a current sensor (114) configured to sense the total current delivered to the electrical load (132) of the power supply (102), determining that the current sensing voltage is less than a predetermined threshold, and configuring the crosspoint switch (106) to exclude delivery of switching phase pulse phases signals (134) of dropped switching phases to sets of power switching components of the power supply and to deliver to sets of power switching components of the power supply only the remaining active switching phase pulse signals (134). That is, the regulator (104) may configure the crosspoint switch (106) to electrically disconnect at least one input to an output of the crosspoint switch (106). A crosspoint switch is a switch having multiple inputs and outputs, with each input capable of being electrically connected to any output. In the example of FIG. 1, the crosspoint switch has three inputs ($Input_1$, $Input_2$, $Input_3$) each of which may be connected to any one of the switch's three outputs ($Output_1$, $Output_2$, $Output_3$). Also in the example of FIG. 1, the crosspoint switch (106) is configured to connecting $Input_1$ and $Output_2$ of the crosspoint switch (106), while $Input_2$ and $Input_3$ are not connected ('NC') to any output. As only one input of the crosspoint switch (106) is connected to an output of the crosspoint switch (106), only one phase of the power supply (102) is active in the example of FIG. 1.

The regulator (104) in the example of FIG. 1 may configure the crosspoint switch (106) through the bus (138), rotating logic (116), and bus (139). The regulator, for example, may configure the crosspoint switch (106) by asserting on one or more of the lines of the bus (138), a signal, with each signal representing an active phase at a particular input of the crosspoint switch (106). Consider as an example, that the regulator (104) asserts a signal on only one line of the bus (138), resulting in a binary pattern of '100' on the bus (138), where such a binary pattern represents an active phase only at $Input_1$ of the crosspoint switch (106). The rotating logic (116) upon receiving such a binary pattern, may electrically disconnect, through the bus (139), electrical pathways between $Input_2$ and $Input_3$ to outputs of the crosspoint switch (106) by addressing the crosspoint switch with a binary pattern for disconnecting $Input_2$ and $Input_3$ from the outputs and connecting $Input_1$ to a particular output. Readers of skill in the art will immediately recognize that asserting signals on a bus connecting the regulator (104) to the rotating logic (116) is but one example way among many possible other ways to configure the crosspoint switch (106) through the rotating logic (116) in power supplies configured for workload balancing among power switching components (136) according to embodiments of the present invention.

The example power supply (102) of FIG. 1 also includes rotating logic configured to rotate the active switching phase among all sets (136) of power switching components. Rotating logic may be implemented in various ways including for example, as a collection of digital logic, as a digital signal processor ('DSP'), as an ASIC or FPGA, or in other ways as may occur to readers of skill in the art. The rotating logic (116) in the example power supply (102) of FIG. 1 may rotate the active switching phase among all sets (136) of power switching components by rotating the active switching phase periodically according to a predetermined period of time during which the active phase is applied to a particular set of power switching components.

The rotating logic (116) may rotate the active switching phase periodically according to a predetermined period of time during which the active phase is applied to a particular set of power switching components, by periodically reconfiguring the crosspoint switch (106) to deliver the switching phase pulse signal (134) of the active switching phase to a next set (136) of power switching components. Periodically reconfiguring the switch to deliver the active switching phase to a next set (136) of switching components may include: sensing the phase switching pulse signal (134) of the active phase through a signal sensing line (124, 126, 128); counting the number of cycles of the phase switching pulse signal (134) of the active phase; and when the number of cycles is equal to a predetermined value, the rotating logic (116) reconfigures the crosspoint switch (106) to connect the input presented with the phase switching pulse signal (134) to a next output. The rotating logic (116) of FIG. 1 may also be configured to rotate the active switching phase when the switching phase pulse signal (134) level (144) is low (142). Consider, for example, that the crosspoint switch (106) of FIG. 1 connects $Input_1$ to $Output_2$. The rotating logic (116) may count, through the signal sensing line (124), the number of cycles of the phase switching pulse signal (134) generated by the pulse generator (118) and presented at $Input_1$, and upon a predefined number of cycles, when the phase switching pulse signal (134) level (144) is low (142), reconfigure the crosspoint switch (106) to connect $Input_1$ to the next output, $Output_3$, thereby rotating the active phase from one set of switching components, FET switch (110) to another set of switching components, FET switch (112).

The regulator (104) in the example of FIG. 1 may also be configured to drop one or more switching phases, leaving two or more active switching phases. That is in some embodiments the regulator (104) may only one drop one active phase, leaving two phases active in the example power supply (102) of FIG. 1. As such, the rotating logic (116) in rotating the active switching phase may be configured to rotate the two active switching phases, including distributing the active phases among non-adjacent sets (136) of power switching components. Such distribution, normally in power supplies having an even number of phases, reduces overlaps in heat generation between adjacent sets of power switching components.

The arrangement of power switching components, load (132), pulse generators (118, 120, 122), busses (138, 139), rotating logic (116) and other devices making up the exemplary power supply (102) illustrated in FIG. 1 are for explanation, not for limitation. Readers of skill in the art will recognize that multiphase switching power supplies (102) configured for workload balancing among power switching components according to embodiments of the present invention may contain more or less components than those depicted in the example of FIG. 1.

Figure 2:
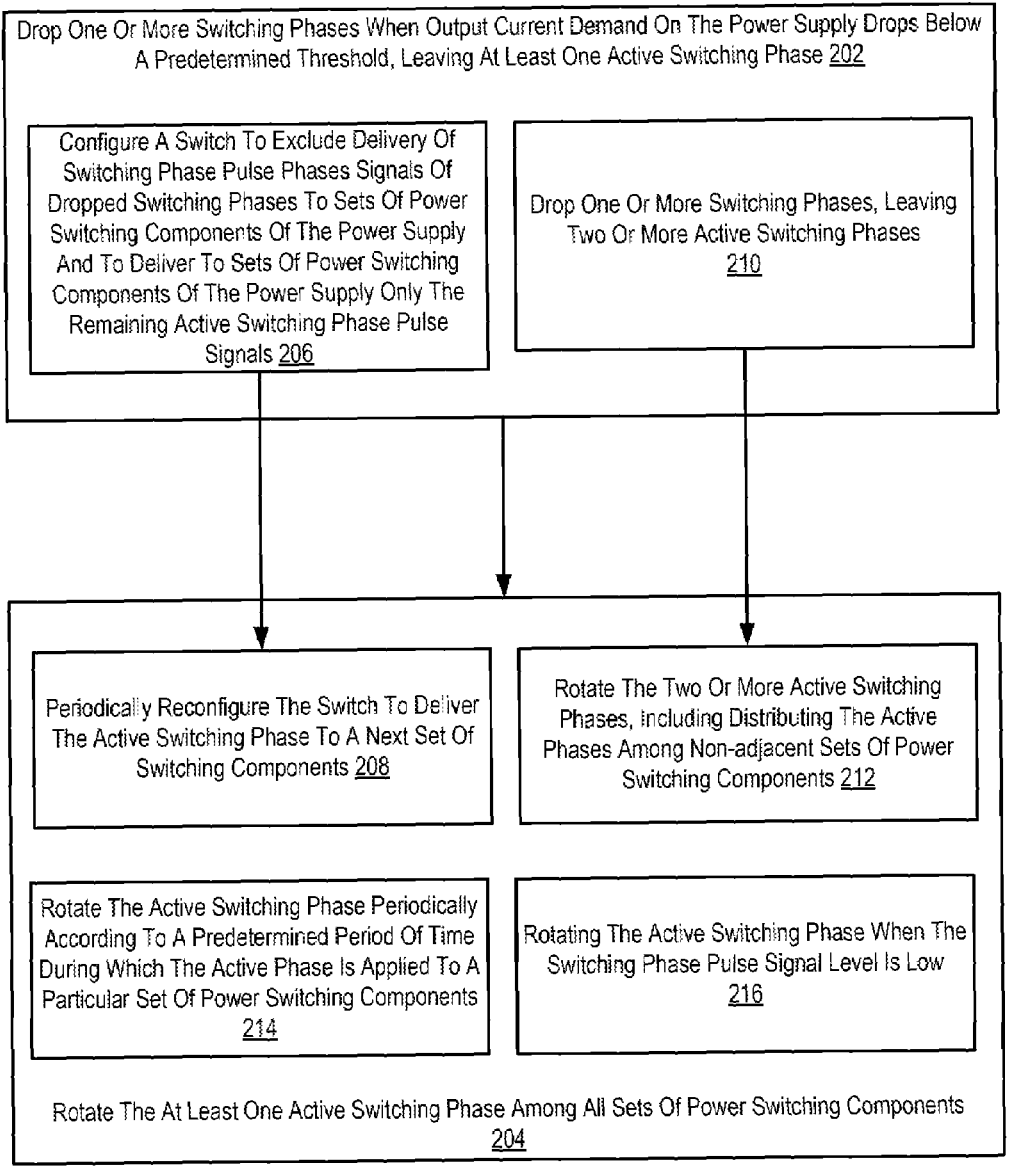
FIG. 2 sets forth a flow chart illustrating an exemplary method for workload balancing among power switching components in a multiphase switching power supply according to embodiments of the present invention.

For further explanation, FIG. 2 sets forth a flow chart illustrating an exemplary method for workload balancing among power switching components in a multiphase switching power supply according to embodiments of the present invention. The method of FIG. 2 is carried out in a multiphase switching power supply similar to the multiphase switching power supply (102) depicted in FIG. 1, that includes one set (136 in FIG. 1) of power switching components for each switching phase.

The method of FIG. 2 includes dropping (202) one or more switching phases when output current demand on the power supply drops below a predetermined threshold, leaving at least one active switching phase and rotating (204) the at least one active switching phase among all sets of power switching components. Dropping (202) one or more switching phases when output current demand on the power supply drops below a predetermined threshold, leaving at least one active switching phase and rotating (204) the at least one active switching phase among all sets of power switching components may be carried out by: receiving a current sensing voltage from a current sensor configured to sense the total current delivered to the electrical load of the power supply; determining that the current sensing voltage is less than a predetermined threshold, and configuring a switch, such as the crosspoint switch (106) of FIG. 1, to exclude delivery of switching phase pulse phases signals of dropped switching phases to sets of power switching components of the power supply and to deliver to sets of power switching components of the power supply only the remaining active switching phase pulse signals.

The power supply in which the method of FIG. 2 is carried out may include a switch, similar to the crosspoint switch (106) of FIG. 1, which delivers switching phase pulse signals to the sets of power switching components. In such an power supply, dropping (202) one or more switching phases includes configuring (206) the switch to exclude delivery of switching phase pulse phases signals of dropped switching phases to sets of power switching components of the power supply and to deliver to sets of power switching components of the power supply only the remaining active switching phase pulse signals. Configuring (206) the switch to exclude delivery of switching phase pulse phases signals of dropped switching phases to sets of power switching components of the power supply and to deliver to sets of power switching components of the power supply only the remaining active switching phase pulse signals may be carried out by asserting, by a regulator of the power supply, a signal on one or more of lines of a bus connecting the regulator to rotating logic, with each signal representing an active phase at an input of the switch.

In the method of FIG. 2 rotating (204) the at least one active switching phase among all sets of power switching components includes rotating (214) the active switching phase periodically according to a predetermined period of time during which the active phase is applied to a particular set of power switching components. A predetermined period of time may include a number of cycles of a number of cycles of a switching phase pulse phases signal, a number of clock cycles, upon a signal to rotate received by the rotating logic from a regulator of the power supply, and other measures of time as may occur to readers of skill in the art. The active switching phase in the example of FIG. 2 may also be characterized by a switching phase pulse signal having two signal levels, low and high. In the method of FIG. 2, when the active switching phase is characterized by a switching phase pulse signal having two signal levels, low and high, rotating (204) the active switching phase includes rotating (216) the active switching phase when the switching phase pulse signal level is low.

As mentioned above, the power supply in which the method of FIG. 2 is carried out may include a switch, similar to the crosspoint switch (106) of FIG. 1, which delivers switching phase pulse signals to the sets of power switching components. In the method of FIG. 2, when the power supply includes such a switch, rotating (204) the active switching phase includes periodically reconfiguring (208) the switch to deliver the switching phase pulse signal of the active switching phase to a next set of power switching components. Periodically reconfiguring (208) the switch to deliver the switching phase pulse signal of the active switching phase to a next set of power switching components may include: sensing the phase switching pulse signal of the active phase through a signal sensing line connected to the output of a pulse generator generating the phase switching pulse signal of the active phase; counting the number of cycles of the phase switching pulse signal of the active phase; and when the number of cycles is equal to a predetermined value, reconfiguring the crosspoint switch to connect the input of switch presented with the phase switching pulse signal of the active phase to a next output of the switch.

In the method of FIG. 2, dropping (202) one or more switching phases may also include dropping (210) one or more switching phases, leaving two or more active switching phases. When two or more active switching phases are left, rotating (204) the at least one active switching phase in the method of FIG. 2 includes rotating (212) the two or more active switching phases, including distributing the active phases among non-adjacent sets of power switching components. Rotating (212) the two or more active switching phases, including distributing the active phases among non-adjacent sets of power switching components may be carried out, typically in power supplies having an even number of phases, by connecting inputs of a switch, such as the crosspoint switch (106) on FIG. 1, to a set of non-adjacent outputs of the switch and periodically reconfiguring the switch to connect the inputs to the next set of non-adjacent outputs.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of workload balancing among power switching components in a multiphase switching power supply, the power supply comprising one set of power switching components for each switching phase and a switch that delivers switching phase pulse signals to all sets of power switching components, the method comprising:

dropping one or more switching phases when output current demand on the power supply drops below a predetermined threshold, leaving at least one active switching phase; and rotating the at least one active switching phase among all sets of power switching components, including periodically reconfiguring the switch to deliver the switching phase pulse signal of the active switching phase to a next set of power switching components.

2. The method of claim 1 wherein rotating the active switching phase further comprises rotating the active switching phase periodically according to a predetermined period of time during which the active phase is applied to a particular set of power switching components.

3. The method of claim 1 wherein:
the active switching phase is characterized by a switching phase pulse signal comprising two signal levels, low and high; and
rotating the active switching phase further comprises rotating the active switching phase when the switching phase pulse signal level is low.

4. The method of claim 1 wherein:
the power supply further comprises a switch that delivers switching phase pulse signals to the sets of power switching components; and
dropping one or more switching phases further comprises configuring the switch to exclude delivery of switching phase pulse phases signals of dropped switching phases to sets of power switching components of the power supply and to deliver to sets of power switching components of the power supply only the remaining active switching phase pulse signals.

5. The method of claim 1 wherein:
dropping one or more switching phases further comprises dropping one or more switching phases, leaving two or more active switching phases; and
rotating the at least one active switching phase further comprises rotating the two or more active switching phases, including distributing the active phases among non-adjacent sets of power switching components.

6. A multiphase switching power supply for workload balancing among power switching components in the multiphase switching power supply, the multiphase switching power supply comprising:
one set of power switching components for each switching phase;
a switch that delivers switching phase pulse signals to all sets of power switching components;
a regulator configured to drop one or more switching phases when output current demand on the power supply drops below a predetermined threshold, leaving at least one active switching phase; and
rotating logic configured to rotate the at least one active switching phase among all sets of power switching components by periodically reconfiguring the switch to deliver the active switching phase to a next set of switching components.

7. The multiphase switching power supply of claim 6 wherein
the rotating logic configured to rotate the at least one active switching phase among all sets of power switching components further comprises rotating logic configured to rotate the active switching phase periodically according to a predetermined period of time during which the active phase is applied to a particular set of power switching components.

8. The multiphase switching power supply of claim 6 wherein:
the active switching phase is characterized by a switching phase pulse signal comprising two signal levels, low and high; and
the rotating logic configured to rotate the at least one active switching phase among all sets of power switching components further comprises the rotating logic configured to rotate the active switching phase when the switching phase pulse signal level is low.

9. The multiphase switching power supply of claim 6 wherein:
the power supply further comprises a switch that delivers switching phase pulse signals to the sets of power switching components; and
regulator configured to drop one or more switching phases further comprises regulator configured to configure the switch to exclude delivery of switching phase pulse phases signals of dropped switching phases to power switching components of the power supply and to deliver to switching components of the power supply only the remaining active switching phase pulse signals.

10. The multiphase switching power supply of claim 6 wherein:
the regulator configured to drop one or more switching phases further comprises the regulator configured to drop one or more switching phases, leaving two or more active switching phases; and
the rotating logic configured to rotate the at least one active switching phase further comprises the rotating logic configured to rotate the two or more active switching phases, including distributing the active phases among non-adjacent sets of power switching components.

* * * * *